United States Patent
McClenahan et al.

(10) Patent No.: US 9,494,421 B2
(45) Date of Patent: Nov. 15, 2016

(54) METHOD FOR MEASURING TRAILER AXLE ALIGNMENT

(71) Applicant: Hunter Engineering Company, Bridgeton, MO (US)

(72) Inventors: James W. McClenahan, St. Louis, MO (US); Michael T. Stieff, Wentzville, MO (US); Timothy A. Strege, Sunset Hills, MO (US); Nicholas J. Colarelli, III, Creve Coeur, MO (US)

(73) Assignee: Hunter Engineering Company, St. Louis, MO (US)

( * ) Notice: Subject to any disclaimer, the term of this patent is extended or adjusted under 35 U.S.C. 154(b) by 160 days.

(21) Appl. No.: 14/332,991

(22) Filed: Jul. 16, 2014

(65) Prior Publication Data

US 2015/0020583 A1    Jan. 22, 2015

Related U.S. Application Data (60) Provisional application No. 61/847,410, filed on Jul. 17, 2013.

(51) Int. Cl.
*G01B 5/25*       (2006.01)
*G01B 11/275*  (2006.01)

(52) U.S. Cl.
CPC ............... *G01B 11/275* (2013.01); *G01B 5/25* (2013.01); *G01B 2210/24* (2013.01)

(58) Field of Classification Search
CPC ............. G01B 11/2755; G01B 2210/24; G01B 2210/30; G01B 5/25

(Continued)

(56) References Cited

U.S. PATENT DOCUMENTS 5,157,838 A * 10/1992 Sims ...................... G01B 5/255
                                                                33/203.18
5,586,062 A * 12/1996 Colarelli, III ...... G01B 11/2755
                                                                33/203.18

(Continued)

OTHER PUBLICATIONS

JOSAM product literature, Form No. T 124 1 1301, "JOSAM i-track Wheel Alignment With Speed and Precision", 4 pages, dated Jan. 2013.

(Continued)

*Primary Examiner* — Freddie Kirkland, III
(74) *Attorney, Agent, or Firm* — Polster, Lieder, Woodruff & Lucchesi, LC (57) ABSTRACT

A procedure for measuring and adjusting an alignment of each axle of a trailer or semi-trailer while the trailer or semi-trailer is coupled to a tow vehicle by a hitch, tow bar, kingpin, or fifth wheel hitch. Measurements of the alignment of each axle of the trailer or semi-trailer are acquired from wheel-mounted sensor means utilizing either directly or indirectly a reference line of the trailer and an established reference point on the tow vehicle. A thrust angle of a first trailer or semi-trailer axle is referenced directly to the established reference line, while scrub angles associated with additional trailer or semi-trailer axles are referenced either directly or indirectly to the first trailer or semi-trailer axle, and indirectly to the established reference point. Any necessary adjustments are made to the first trailer or semi-trailer axle to bring the axle thrust angle to within a specification tolerance, and then to the scrub angle of each additional axle.

18 Claims, 7 Drawing Sheets

(58) Field of Classification Search
USPC .................................................... 73/117.01
See application file for complete search history.

(56) References Cited

U.S. PATENT DOCUMENTS

| | | | | |
|---|---|---|---|---|
| 6,219,134 | B1* | 4/2001 | Voeller | G01B 11/2755 33/203.12 |
| 6,397,448 | B1* | 6/2002 | Cobb | G01B 11/27 29/407.01 |
| 6,405,109 | B1* | 6/2002 | Kyrtsos | G01M 17/02 701/33.9 |
| 6,886,266 | B2 | 5/2005 | Kidd et al. | |
| 7,415,771 | B2* | 8/2008 | Harrill | B60G 17/019 33/203.18 |
| 7,467,473 | B2* | 12/2008 | Harrill | B60G 7/006 33/203.18 |
| 7,877,884 | B2* | 2/2011 | Harrill | B60G 7/006 33/203.18 |
| 7,974,806 | B1 | 7/2011 | Burns et al. | |
| 8,804,107 | B2* | 8/2014 | Giacomini | G01B 11/2755 356/139.09 |
| 9,212,907 | B2* | 12/2015 | D'Agostino | G01B 21/26 |
| 2009/0106990 | A1* | 4/2009 | Harrill | B60G 7/006 33/288 |
| 2014/0253909 | A1* | 9/2014 | McClenahan | G01B 11/2755 356/139.09 |

OTHER PUBLICATIONS

JOSAM product literature, Form No. T 191 1106, "JOSAM truckaligner II", 4 pages, dated Nov. 2006.
JOSAM product literature, Form No. T 123 1 1401, "JOSAM truckaligner 180°", 4 pages, dated Jan. 2014.

* cited by examiner

METHOD FOR MEASURING TRAILER AXLE ALIGNMENT

CROSS-REFERENCE TO RELATED APPLICATIONS

The present application is related to, and claims priority from, U.S. Provisional Patent Application Ser. No. 61/847,410 filed on Jul. 17, 2013 and which is herein incorporated by reference.

STATEMENT REGARDING FEDERALLY SPONSORED RESEARCH

Not Applicable.

BACKGROUND OF THE INVENTION

The present application is related generally to the measurement and alignment of the axles of a trailer or semi-trailer configured to be coupled to a tow vehicle, and in particular, to a method for measuring the alignment of the axles of a single or multi-axle trailer or semi-trailer without the need to jack the trailer or semi-trailer off the ground, without the need to reposition sensors from one location to another, and without the need to separate the trailer or semi-trailer from the tow vehicle.

Figure 1:
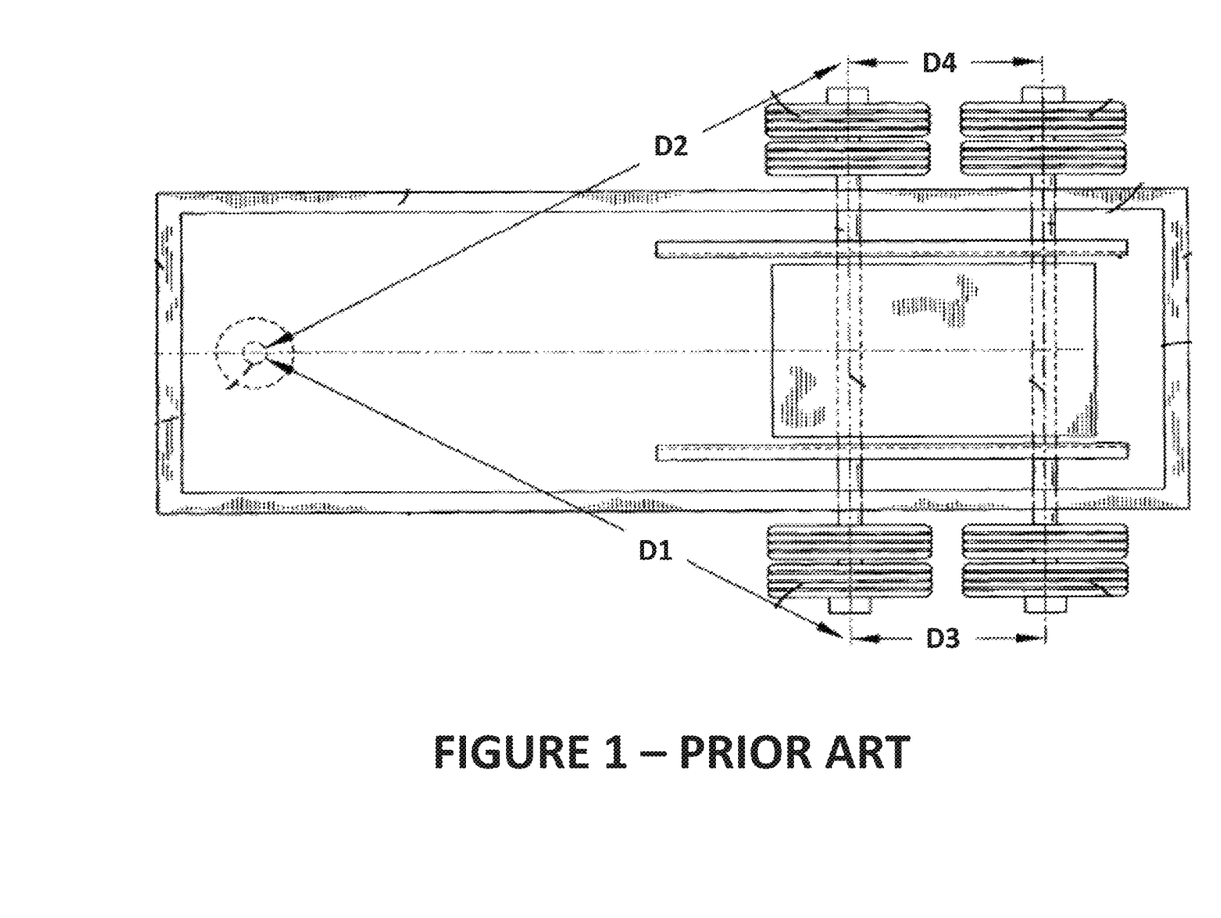
FIG. 1 is an illustration of a prior art kingpin reference for aligning the axles of a detached tandem axle semi-trailer.
Figure 2:
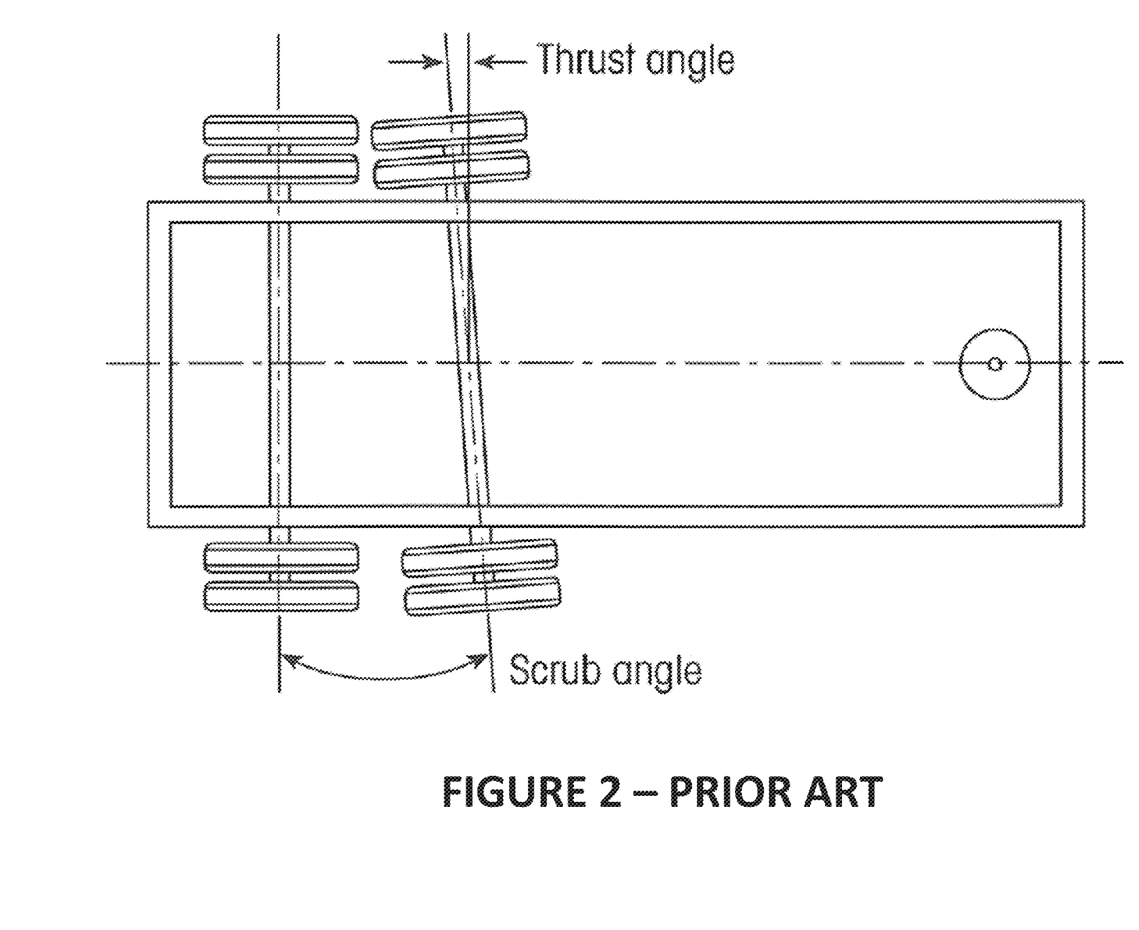
FIG. 2 is an illustration of prior art thrust and scrub angles on a tandem axle semi-trailer.

The measurement and alignment of the axles of a single or multi-axle trailer or semi-trailer is commonly a time consuming process, but one which is beneficial to optimize fuel economy, improve handling, and prevent excessive tire wear. Initially, the trailer or semi-trailer to be serviced is towed into the service or inspection facility by a tow vehicle, and positioned in service bay. The tow vehicle is uncoupled from the trailer or semi-trailer and moved away. For semi-trailers, this provides the service technicians with access to the kingpin or fifth wheel coupling from which the semi-trailer is towed by the tow vehicle. The kingpin or fifth wheel coupling is utilized to establish a reference location on the body or frame of the semi-trailer relative to which the semi-trailer axles can be measured and aligned, such as shown in U.S. Pat. No. 6,886,266 B2 to Kidd et al. and seen in FIG. 1. An ideal alignment scenario for a trailer or semi-trailer is one in which all of the trailer or semi-trailer wheels are parallel to one another and perpendicular to the centerline of the trailer or semi-trailer (i.e., when D1=D2 and D3=D4 as seen in FIG. 1). This is achieved, as shown in FIG. 2, by initially adjusting the thrust angle of one trailer or semi-trailer axle, and on a tandem-axle or multi-axle trailers or semi-trailers, subsequently adjusting the scrub angle between the initially adjusted axle and each remaining axle.

In order to utilize the kingpin or fifth wheel coupling to establish a reference location, a sensor bar or kingpin adapter is connected to, or aligned with, the kingpin or fifth wheel coupling at a longitudinally centered reference point. The reference point is generally horizontally perpendicular to the semi-trailer centerline. The opposite longitudinal ends of the sensor bar are configured to each receive and support an alignment sensor unit adjacent to a respective side of the semi-trailer. Each alignment sensor unit provides an observable reference point for additional sensor units initially mounted to the outer wheel assemblies on a first axle of the semi-trailer, from which the distance between the wheel-mounted sensor units and the kingpin or fifth wheel coupling reference point can be determined. Once the thrust angle of the first axle of the semi-trailer is measured and aligned relative to the kingpin reference point, the first pair of alignment sensor units is removed from the sensor bar or kingpin adapter, and for a tandem axle semi-trailer, mounted to a second axle of the semi-trailer. With the alignment sensor units mounted to the second axle of the semi-trailer, distances between the outermost wheels on the first and second axles are measured to determine the associated scrub angle. The associated scrub angle between the axles is then adjusted as necessary by altering the orientation of the second axle, bringing the tandem axles into parallel alignment within a required tolerance. For multi-axle semi-trailers having more than two axles, the alignment sensor units mounted to the second axle are removed and remounted on the next adjacent unaligned axle to acquiring measurements relative to the first axle, enabling necessary adjustments to the scrub angle between the axles to be made by altering the orientation of the new axle. The process is repeated for each unadjusted axle of the semi-trailer until all subsequent axles have been measured and aligned relative to the first axle to within specification tolerances.

Depending upon the type and configuration of the alignment sensor units being utilized on the trailer or semi-trailer, it may be necessary to elevate the wheels of individual axles off the ground and carry out a runout compensation procedure each time the sensors are mounted. Some runout compensation procedures require rotating a wheel about its axis while recording measurements with the installed alignment sensor at several different rotational positions. Hence, for a tandem or multi-axle trailer or semi-trailer, it may be necessary to elevate the trailer or semi-trailer axles two or more times, once to compensate the alignment sensors mounted to the first axle, and once each time a set of alignment are sensors remounted on an unadjusted axle. The process of elevating the trailer or semi-trailer and sequentially compensating sensors is time consuming, and may require specialized lifting equipment.

Accordingly, there is a need in the industry to improve the efficiency of trailer and semi-trailer axle measurement procedures, and in particular, a need to reduce the steps required to measure and adjust tandem or multi-axle trailers or semi-trailers.

BRIEF SUMMARY OF THE INVENTION

Briefly stated, the present application sets forth a procedure for measuring and adjusting an alignment of each axle of a trailer or semi-trailer while the trailer or semi-trailer remains coupled to a tow vehicle, such as by a hitch, kingpin, or fifth-wheel hitch. The alignment of each axle of the trailer or semi-trailer is measured utilizing an established reference point, such as an axial midpoint of the tow vehicle rearmost axle and an established reference line, such as a thrust line or trailer centerline. A thrust angle of a first trailer or semi-trailer axle is measured, while scrub angles associated with each of remaining trailer axles are sequentially indexed to the first axle or to a previously measured axle, indirectly utilizing the established reference point and reference line. Any necessary adjustments are made to the first trailer or semi-trailer axle to bring the axle thrust angle to within a specification tolerance, and then to the scrub angle of each remaining axle in a sequential manner.

In one embodiment of the present application, a pair of conventional alignment angle sensors or optical targets is mounted on the outer wheels of each axle of the single or tandem axle trailer or semi-trailer, and an additional pair of conventional alignment angle sensors or optical targets is mounted on the outer wheels of the rearmost or reference axle of a tow vehicle coupled to the semi-trailer. Each pair of alignment angle sensors or optical targets is used in conjunction with an alignment system console configured to process and display alignment data to an operator. With each pair of conventional alignment angle sensors or optical targets mounted, the tow vehicle and coupled trailer or semi-trailer are rolled a short distance to acquire measurement data necessary to identify and compensate for runout present in each of the respective mountings and wheels. Once the runout compensation step is completed, the conventional alignment angle sensors or optical targets mounted to the tow vehicle rearmost or reference axle are utilized by the alignment system console to establish a virtual reference point, such as at an axial midpoint of the tow vehicle rearmost axle. The conventional alignment angle sensors or optical targets on a reference axle of the trailer or semi-trailer are next utilized to measure an axle thrust angle for the trailer reference axle relative to the established virtual reference point, and any to identify any necessary thrust angle adjustments relative to an established thrust line or centerline. In a tandem axle configuration, measurements of the scrub angle between the adjusted trailer reference axle of the trailer or semi-trailer and the remaining tandem axle are obtained from measurements acquired by the associated conventional alignment angle sensors or optical targets on the two axles. Using the measured thrust scrub angles, adjustments to the trailer or semi-trailer tandem axle are directed from the alignment system console to align the tandem axles to within a specification tolerance.

In one embodiment of the present application, the procedure set forth herein is extended to trailers or semi-trailers having more than two axles by mounting a pair of conventional alignment angle sensors or optical targets to the outer wheels of each axle of the trailer or semi-trailer, and acquiring data necessary to compensate each sensor or optical target for runout concurrently during a rolling movement of the coupled tow vehicle and trailer or semi-trailer. Once the thrust angle for a reference axle of the trailer or semi-trailer is measured and adjusted, the steps of measuring and adjusting the scrub angle for each remaining axle of the trailer or semi-trailer are iteratively repeated between the adjusted reference axle and the each unadjusted axle until the scrub angles between each trailer or semi-trailer axle is within a specification tolerance.

In one embodiment of the present application, measurements of the alignment of each axle of the trailer or semi-trailer are acquired using a non-contact machine vision measurement system, utilizing either directly or indirectly a reference point established at the axial midpoint of the rearmost axle on a tow vehicle coupled to the trailer or semi-trailer hitch, kingpin, or fifth-wheel connector.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

It will be readily understood by those of ordinary skill in the art that the present disclosure sets forth alignment angle measuring procedures which may be carried out with a suitably configured alignment console using either conventional alignment angle sensors, such as the DSP700T sensors sold by Hunter Engineering Company of St. Louis, Missouri or optical targets and associated machine vision sensors. The specific type of sensor utilized (convention or optical target/machine vision sensor) must be capable of acquiring sufficient measurement data from which the necessary axle alignment angles can either be measured directly or determined by computation. The various configurations of different types of sensors, targets, and methods for processing acquired images to obtain alignment angle data are known to those of ordinary skill in the art. Accordingly, it will be understood that the term "alignment sensor means" as used herein may refer either to any conventional alignment angle sensor as used in the industry, or to a combination consisting of optical targets, associated observing machine vision sensors, and a processor configured with suitable image processing software to process images of the optical targets acquired by the machine vision sensors as known in the industry, unless specifically indicated otherwise.

It will be understood that the present disclosure sets forth a procedure that may be utilized with both semi-trailers and with trailers. Trailers are generally coupled to the tow vehicle by means of a hitch or tow bar, while semi-trailers are generally coupled to the tow vehicle by means of a kingpin coupling or fifth-wheel connector. As used herein, the terms trailer and semi-trailer are intended to encompass either trailer or semi-trailer configurations, including articulated vehicles such as busses, unless used specifically in reference to the type of connection to the tow vehicle. The procedures set forth herein have application for the alignment of axles on both trailers and semi-trailers.

Turning to the Figures, and to FIGS. 3-6 in particular, a procedure for measuring and adjusting an alignment of each axle of a trailer or semi-trailer 50, while the trailer or semi-trailer 50 remains coupled to a tow vehicle 52 by a hitch, tow bar, kingpin, or fifth wheel hitch, is set forth. In general, measurements of the alignment of the axles of the trailer or semi-trailer 50 coupled to the tow vehicle 52 are acquired from wheel-mounted alignment sensor means, utilizing either directly or indirectly a measurement reference point associated with a reference line of the trailer or semi-trailer 50, such as a thrust line or the trailer centerline established between the kingpin and the lateral midpoint of the trailer frame at the opposite end of the trailer. Another alternative reference line for the trailer may be established between the kingpin and the lateral midpoint of a reference axle of the trailer.

In one embodiment, the measurement reference point is established at the axial midpoint of the rearmost axle 54 of the tow vehicle 52 while the tow vehicle is coupled to the trailer or semi-trailer. The measured reference point is aligned with the laterally centered location of the hitch, tow bar coupling, kingpin, or fifth-wheel hitch receiver 56 on the frame of the tow vehicle 52, and with the corresponding coupling on the trailer or semi-trailer from which the trailer reference line is established. The reference point may be utilized by itself as part of a thrust angle measurement procedure for a trailer axle, or may be utilized in combination with another measurement point on the trailer or semi-trailer to establish a reference line, such as a thrust line or centerline.

In one embodiment, a thrust angle of a first selected trailer axle 58, such as the forwardmost trailer axle, is established using the measurement reference point and alignment data measured at the associated wheel assemblies. Scrub angles associated with each additional axle of the trailer or semi-trailer 50 are next referenced directly or indirectly to the first selected trailer axle 58, and hence indirectly to the measurement reference point. Any necessary adjustments are made initially to the first selected trailer axle 58 to bring the axle thrust angle to within a specification tolerance, and then to the scrub angle of each additional axle present on the trailer or semi-trailer 50. Those of ordinary skill in the art will recognize that the first selected trailer axle 58 does not need to be a specific axle, such as the forwardmost trailer axle, but may be any of the trailer or semi-trailer axles, such as the rearmost axle or an intermediate axle.

Figure 3:
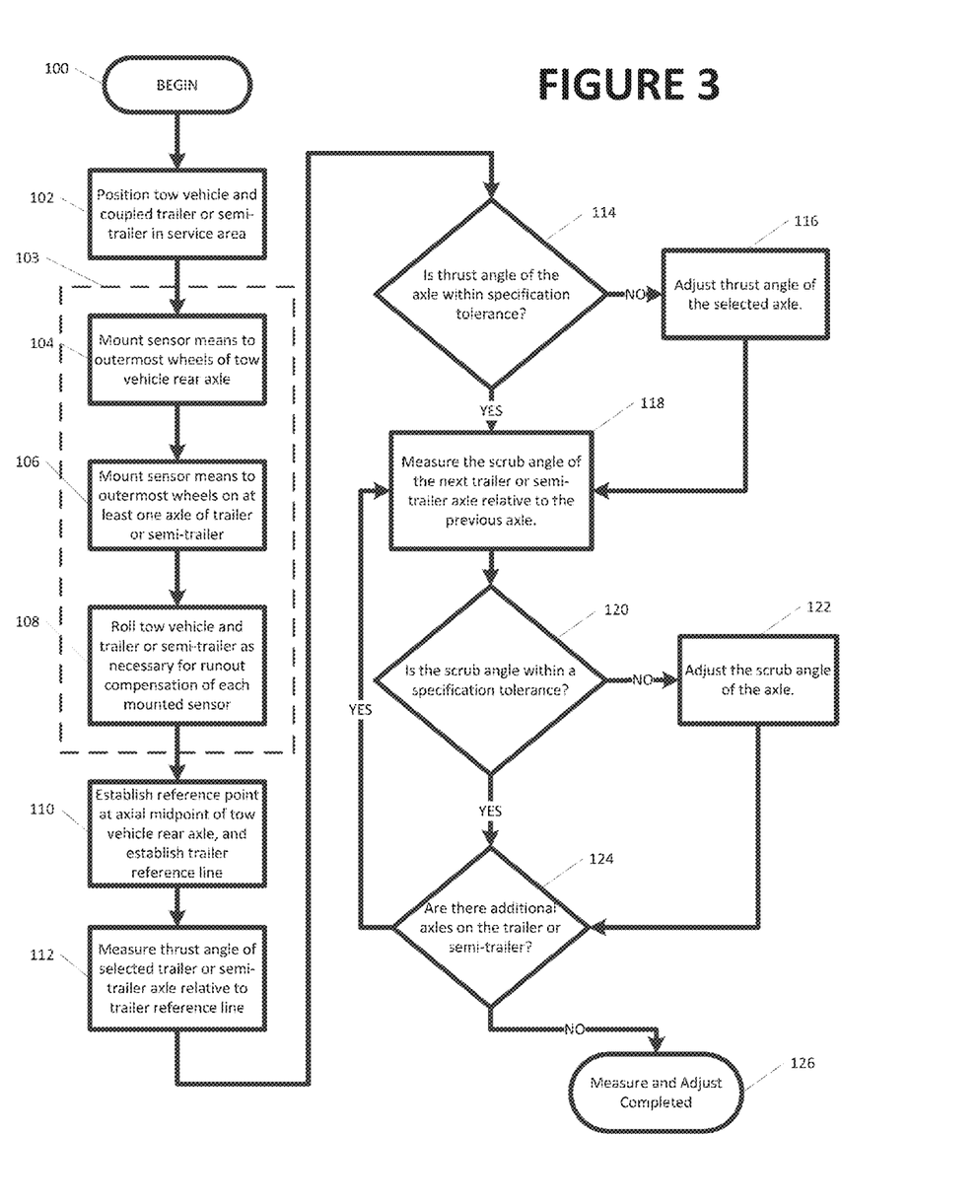
FIG. 3 is a flow chart of a procedure for semi-trailer axle measurement and adjustment of the present disclosure.
Figure 4:
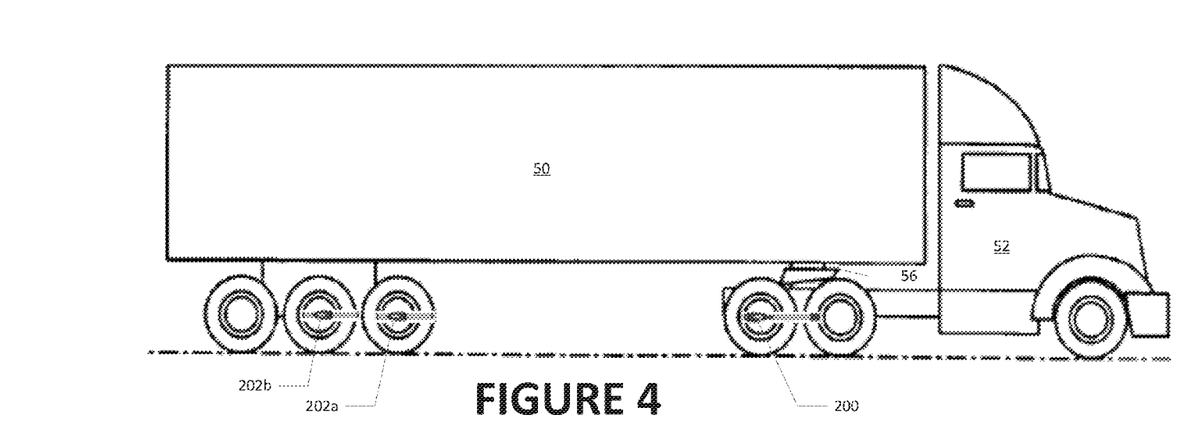
FIG. 4 is a side view of a tractor-trailer on which alignment angle sensors are mounted for measurement of two out of three of the semi-trailer axles according to a method of the present disclosure.
Figure 5:
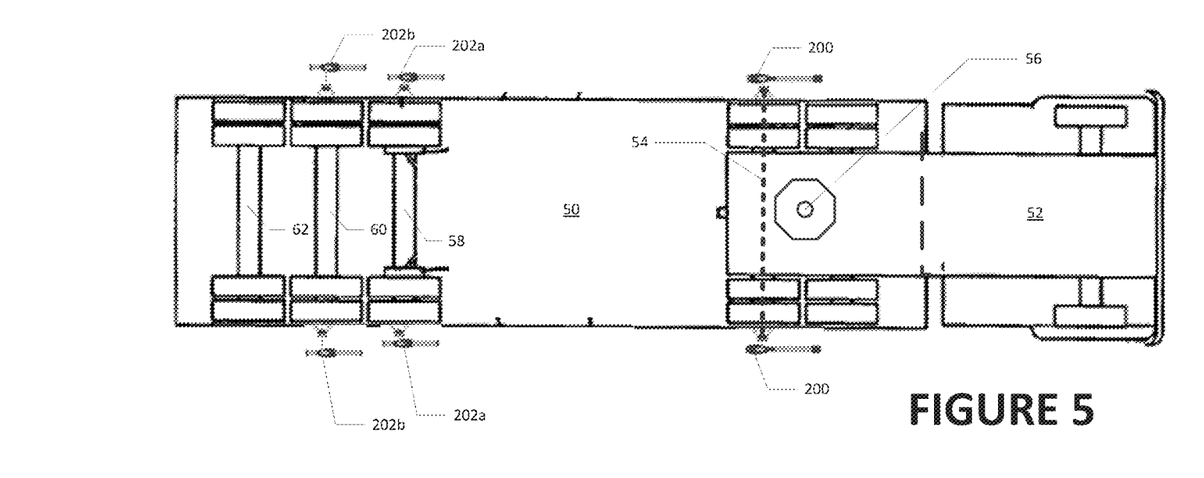
FIG. 5 is a cut-away top view of FIG. 4.
Figure 6:
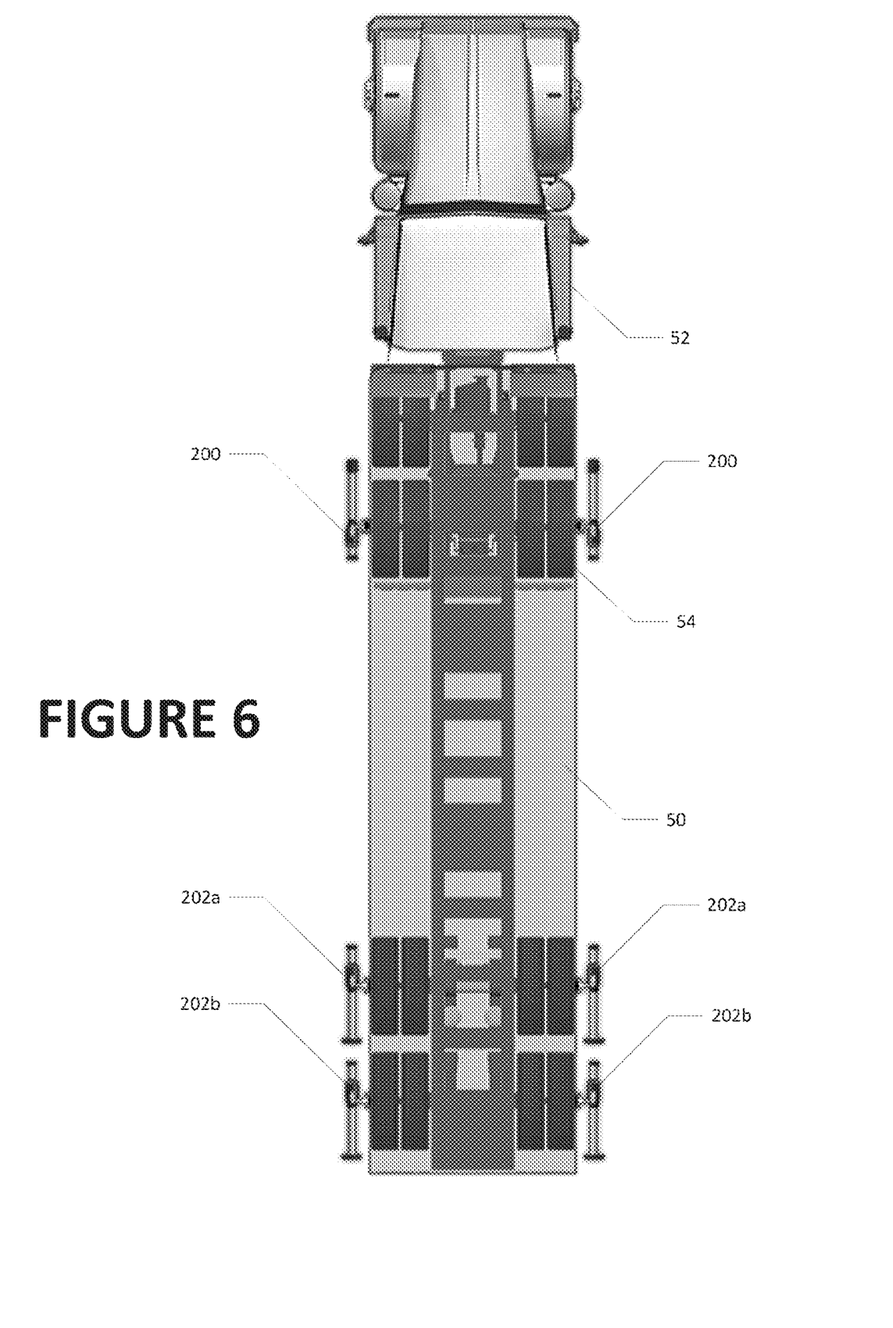
FIG. 6 is a cut-away top view of a tractor-trailer on which alignment angle sensors are mounted for measurement of the tandem axles of the semi-trailer according to a method of the present disclosure.

In one embodiment of the present application, a trailer or semi-trailer axle measurement and adjustment procedure shown in FIG. 3 begins (Box 100) by positioning the tow vehicle 52 and the coupled trailer or semi-trailer 52 in a service area (Box 102). If wheel-mounted alignment sensor means 200, 202 are to be utilized to acquire measurements, a pair of conventional alignment sensors or optical targets 200 are mounted on the outer wheels of a non-steered axle (such as the rearmost axle 54) of the tow vehicle 52 coupled to the trailer or semi-trailer (Box 104). A pair of conventional alignment sensors or optical targets 202a, 202b are mounted on the outer wheels of one or more axles (58, 60) of the trailer or semi-trailer 50 (Box 106), for example, starting with the forwardmost axle 58. An alignment system console (not shown) is configured to process data received from the various sensors, and to display instructions and alignment data to an operator. With each pair of conventional alignment sensors or optical targets 200, 202a, 202b mounted, the tow vehicle 52 and coupled trailer or semi-trailer 50 are rolled a short distance (Box 108) to acquire data necessary to compensate measurement data for runout present in at least the respective mountings and wheels on the trailer or semi-trailer 50, such as by a rolling compensation procedure shown in U.S. Pat. No. 7,974,806 B1 to Burns et al., which is herein incorporated by reference. If a non-contact system is employed to acquire measurements from the tow vehicle and trailer or semi-trailer in place of alignment sensor means, the steps in Box 103 are not required.

Once the runout compensation steps (Box 103) are completed, the conventional alignment sensors or optical targets 200 mounted to the tow vehicle axle 54 are utilized by the software program running on, or executed by, the alignment system console processor to establish a virtual measurement reference point and any required reference lines (Box 110). The reference point may be at an axial midpoint of the tow vehicle rearmost axle 54, corresponding to a point on a reference line of the trailer or semi-trailer 50, while the reference line may be established as the trailer centerline or an associated thrust line. The conventional alignment sensors or optical targets 202a on the trailer or semi-trailer first selected axle 58 measure a thrust angle for the first selected axle 58 utilizing at least the established reference point (Box 112). The measured thrust angle is compared with associated specification tolerances (Box 114), and the axle is adjusted if necessary (Box 116). After the thrust angle of the first selected trailer axle 58 is determined to be within specification tolerance, a measurement of a scrub angle between the first selected axle 58 of the trailer or semi-trailer and an additional trailer axle (such as the first rearward adjacent tandem axle 60, if present) is obtained using data acquired by the associated conventional alignment sensors or optical targets on the two axles (Box 118). The measured scrub angle is compared with associated specification tolerances (Box 120), and the additional axle is adjusted if necessary (Box 122). If there are further additional axles 62 on the trailer or semi-trailer 50 (Box 124), the process of measuring and adjusting scrub angles is iteratively repeated for each additional axle relative to the first selected axle 58, until the scrub angle between each axle on the trailer and the first selected axle 58 on the trailer has been measured (directly or indirectly) and adjusted (Box 126).

Figures 7, 8:
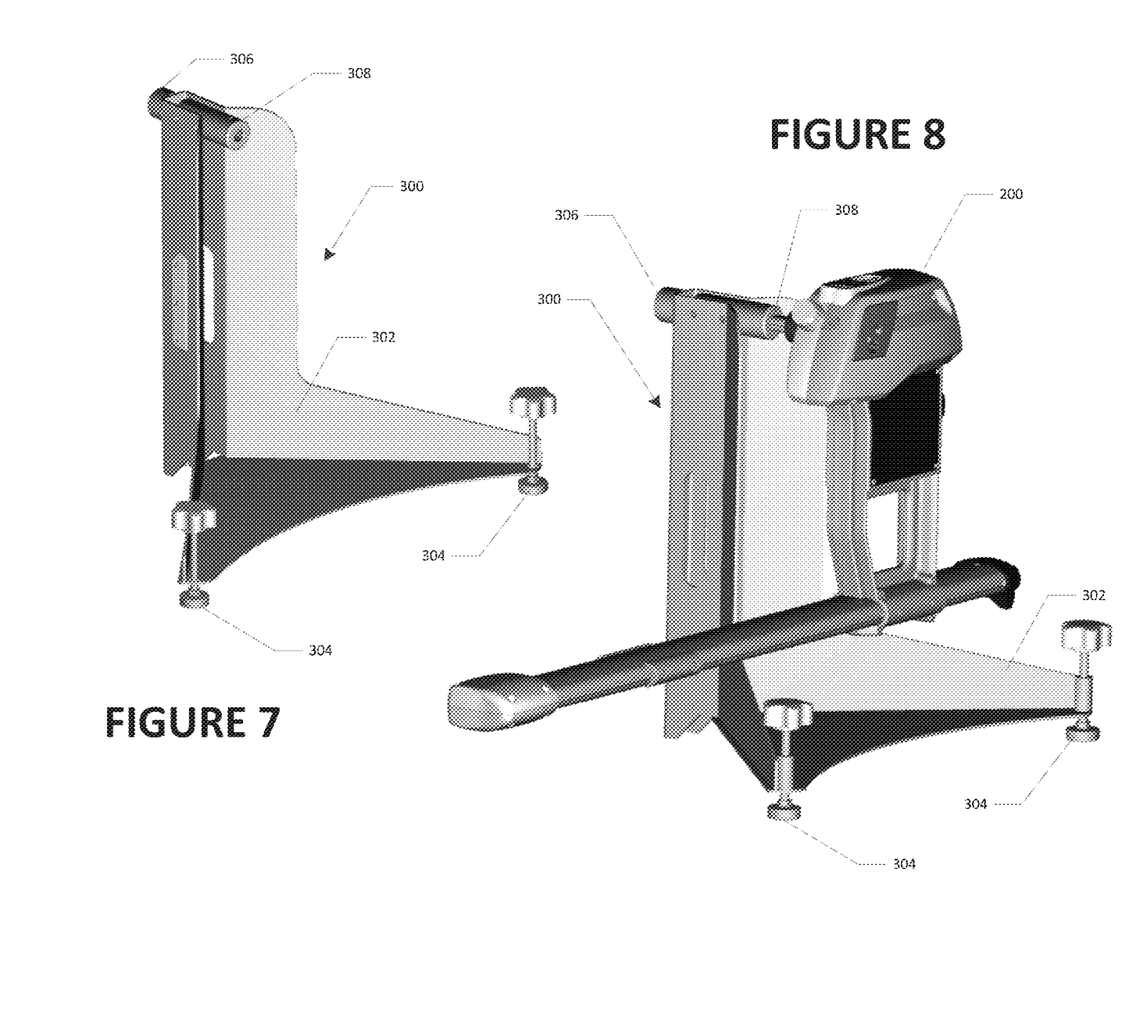
FIG. 7 is a front perspective view of a stand for supporting an alignment sensor or optical target in abutting contact with a trailer or semi-trailer body or frame.
FIG. 8 illustrates the stand of FIG. 7 with an alignment sensor operatively mounted for obtaining measurement data.
Figures 9, 10:
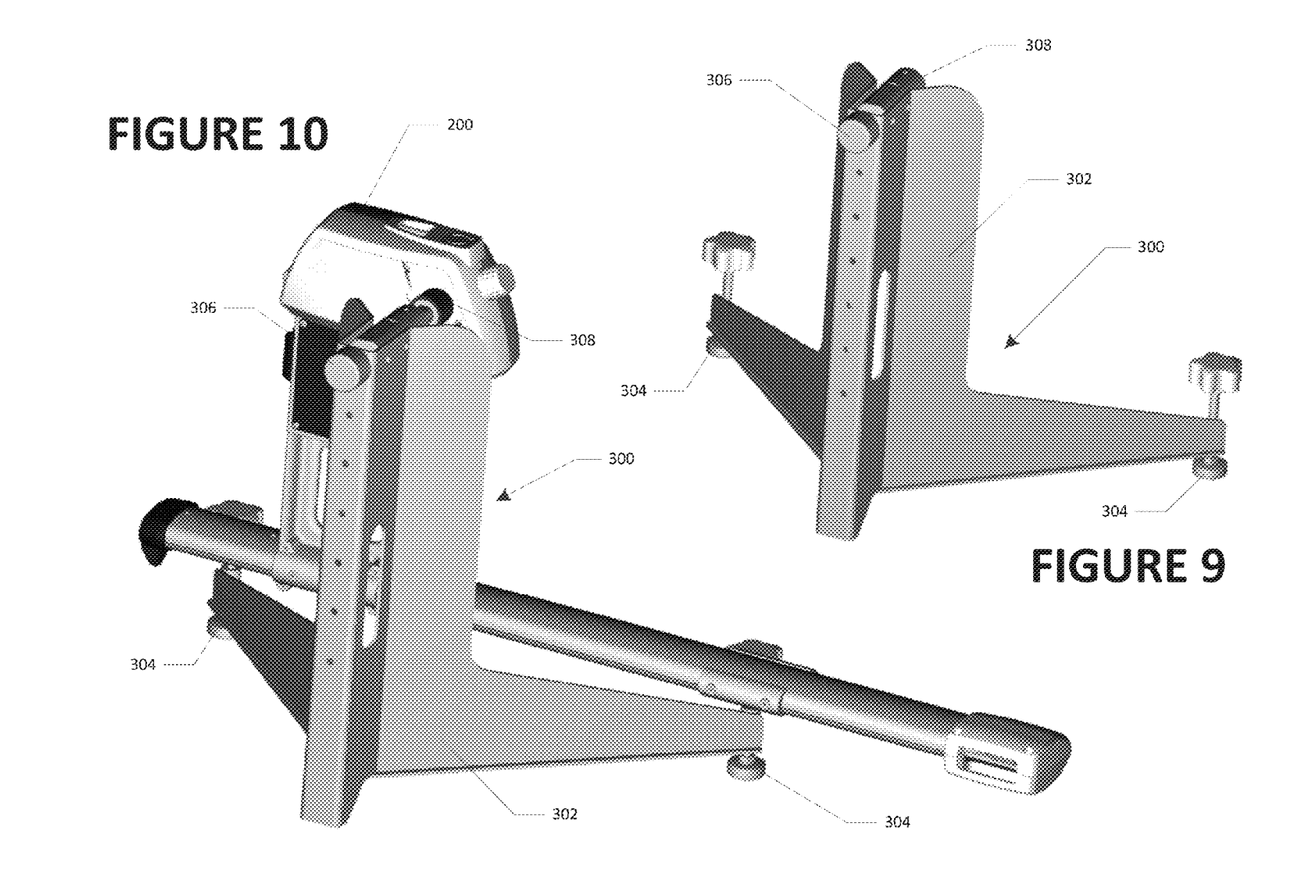
FIG. 9 is a rear perspective view of the stand of FIG. 7.
FIG. 10 illustrates the stand of FIG. 8 with an alignment sensor operatively mounted for obtaining measurement data.

In an alternate configuration of the present disclosure, the measurement reference point is established with the use of one or more measurement reference gauges or gauge elements while the trailer or semi-trailer is coupled to the tow vehicle, instead of with the use of alignment sensors mounted to wheel assemblies on an axle of the tow vehicle. The measurement reference gauges may be of any suitable configuration capable of providing data from which a reference point on the trailer or semi-trailer reference line can be determined. For example, the measurement reference gauges may be a pair of simple optical targets or alignment sensors positioned equidistantly on opposite sides of the frame of the tow vehicle, the frame of the trailer, or the trailer body, by one or more associated support structures such that a determinable mid-point location between the pair lies on a reference line, such as the centerline, of the trailer or semi-trailer 50. The associated support structure of the measurement reference gauges may be one or more discrete assemblies mounted directly or indirectly to the tow vehicle, trailer frame, or to the trailer body, or which may be positioned on a floor surface adjacent to, and in abutting contact with, opposite sides of the tow vehicle or trailer body, using a stable support structure 300, such as shown in an exemplary configuration in FIGS. 8-10.

The exemplary support structure 300 consists of an upright base member 302 having a number of spaced apart leveling feet 304 in a stable configuration for placement on a floor surface. A defined abutment point 306 at an upper end of the base member 302 is provided for positioning the support structure 300 against a vehicle surface. A single sensor mount 308 is disposed at a known position relative to the defined abutment point, for receiving and supporting an alignment angle sensor 200 or optical target, such that measurements obtained from the alignment angle sensor 200 or optical target can be associated with the abutted vehicle surface. Placing a pair of these exemplary support structures 300 on opposite sides of the body of the tow vehicle, trailer, or semi-trailer, in abutting contact therewith enables the determination of a vehicle body mid-point location.

Those of ordinary skill in the art will recognize that an alternative support structure may consist of a single assembly, commonly referred to as a "frame gauge" for attachment to the frame, body, or hitch-structure of a tow vehicle, trailer, or semi-trailer, and capable of supporting each measurement reference gauge of a pair in a laterally spaced arrangement in proximity to opposite lateral sides of the tow vehicle, trailer, or semi-trailer.

It will be recognized that the processing of measurement data associated with the tow vehicle and trailer or semi-trailer, whether received from wheel-mounted alignment sensor means, from non-contact sensors, or from floor-, frame-, or body-associated measurement means, can be carried out on any type of processing system configured with suitable software instructions as is known in the truck alignment industry. The processing of measurement data may be done locally, or may be carried out at a remote system via communications over any suitable interconnecting network, and the results presented for display to an operator for guiding any necessary adjustments to either the tow vehicle or trailer axles via any suitable operator interface.

The present disclosure can be embodied in-part in the form of computer-implemented processes and apparatuses for practicing those processes. The present disclosure can also be embodied in-part in the form of computer program code containing instructions embodied in tangible media, or another computer readable storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A method for measuring alignment of one or more axles on a trailer or semi-trailer coupled to a tow vehicle, comprising:
   establishing a first measurement reference point on the tow vehicle;
   establishing a reference line associated with the trailer or semi-trailer between said first measurement reference point on the tow vehicle and a second measurement reference point on the trailer or semi-trailer; and
   measuring an orientation of a first selected axle on the trailer or semi-trailer utilizing the established reference line while said trailer or semi-trailer remains coupled to the tow vehicle.

2. The method of claim 1 wherein said reference line defines one of a centerline or a thrust line of the trailer or semi-trailer structure.

3. The method of claim 1 further including the step of adjusting an orientation of said first axle on the trailer or semi-trailer to within a specification tolerance relative to said established reference line.

4. The method of claim 1 wherein said measured orientation is a thrust angle.

5. The method of claim 1 further including the step of measuring an orientation of at least one additional axle relative to said first selected axle while said trailer or semi-trailer remains coupled to the tow vehicle.

6. The method of claim 5 wherein said measured orientation of said at least one additional axle is a scrub angle.

7. The method of claim 1 where said step of establishing a measurement reference point associated with the tow vehicle includes identifying an axial midpoint of a non-steer axle on the tow vehicle.

8. The method of claim 1 further including the step of mounting an alignment sensor means to each outer wheel assembly on an axle of the tow vehicle and to each outer wheel assembly on said first selected axle of the trailer or semi-trailer; and
   simultaneously conducting a rolling runout compensation procedure for each mounted alignment sensor means on the tow vehicle and coupled trailer or semi-trailer.

9. The method of claim 8 further including the step of mounting an additional alignment sensor means to at least one additional axle of the trailer or semi-trailer; and
   wherein each of said additional alignment sensor means is included in said simultaneously conducted rolling runout compensation procedure.

10. A method for measuring alignment of one or more axles on a trailer or semi-trailer coupled to a tow vehicle, comprising:
    establishing a measurement reference point associated with the tow vehicle;
    establishing a reference line associated with the trailer or semi-trailer;
    mounting an alignment sensor means to each outer wheel assembly on at least one axle of the coupled trailer or semi-trailer;
    conducting a rolling runout compensation procedure for said mounted alignment sensor means on the trailer or semi-trailer while the trailer or semi-trailer remains coupled to the tow vehicle to compensate measurements from said mounted alignment sensor means;
    acquiring alignment measurement data from each of said mounted alignment sensor means; and adjusting an orientation of said one or more axles on the trailer or semi-trailer to within a specification tolerance utilizing said established reference point and said established reference line in response to said acquired alignment measurement data indicating misalignment.

11. The method of claim 10 further including the step of positioning at least one gauge element relative to the tow vehicle, trailer, or semi-trailer, said gauge element positioned in a determinable relation to a centerline of the trailer or semi-trailer; and establishing said measurement reference point on said centerline utilizing said gauge element.

12. The method of claim 11 wherein a pair of gauge elements are positioned by mounting to the outer wheel assemblies on an axle of the tow vehicle, and wherein each gauge element includes an alignment sensor.

13. The method of claim 11 wherein said at least one gauge element is positioned by mounting to a frame of the tow vehicle.

14. The method of claim 11 wherein said at least one gauge element is positioned by mounting to a body of said trailer or semi-trailer.

15. The method of claim 11 wherein a pair of gauge elements are temporarily positioned on a floor surface in abutting placement against opposite sides of said tow vehicle, trailer, or semi-trailer.

16. The method of claim 11 wherein said at least one gauge element is positioned by mounting to a frame of said trailer or semi-trailer.

17. A method for measuring alignment of at least two axles on a multi-axle trailer or semi-trailer coupled to a tow vehicle, comprising:

establishing a measurement reference point associated with the tow vehicle;

establishing a reference line associated with the trailer or semi-trailer;

mounting an alignment sensor means to each outer wheel assembly on said at least two axles of the coupled multi-axle trailer or semi-trailer; and acquiring from said mounted alignment sensor means, a measurement of a thrust angle for a first axle of the multi-axle trailer or semi-trailer utilizing said established reference point and said established reference line, and a measurement of a scrub angle for at least a second axle of the multi-axle trailer or semi-trailer, while said multi-axle trailer or semi-trailer remains coupled to the tow vehicle.

18. A method for measuring alignment of one or more axles on a trailer or semi-trailer coupled to a tow vehicle, comprising:

mounting alignment sensor means to the tow vehicle and to each outer wheel assembly on a first selected axle of the trailer or semi-trailer;

establishing a measurement reference point associated with the tow vehicle from said alignment sensor means mounted to the tow vehicle;

establishing a reference line associated with the trailer or semi-trailer;

conducting a rolling runout compensation procedure to compensate each mounted alignment sensor means on the coupled trailer or semi-trailer; and measuring an orientation of a first axle on the trailer or semi-trailer with said compensated alignment sensor means, utilizing the established reference point and the established reference line while said trailer or semi-trailer remains coupled to the tow vehicle.

* * * * *